(12) United States Patent
Peng et al.

(10) Patent No.: US 11,496,694 B2
(45) Date of Patent: Nov. 8, 2022

(54) DUAL SENSOR IMAGING SYSTEM AND IMAGING METHOD THEREOF

(71) Applicant: Altek Semiconductor Corp., Hsinchu (TW)

(72) Inventors: Shih-Yuan Peng, Hsinchu (TW); Shu-Chun Cheng, Hsinchu (TW); Hsu-Lien Huang, Taipei (TW); Yun-Chin Li, Hsinchu (TW); Kuo-Ming Lai, Hsinchu (TW)

(73) Assignee: Altek Semiconductor Corp., Hsinchu (TW)

( * ) Notice: Subject to any disclaimer, the term of this patent is extended or adjusted under 35 U.S.C. 154(b) by 64 days.

(21) Appl. No.: 17/190,429

(22) Filed: Mar. 3, 2021

(65) Prior Publication Data

US 2021/0195087 A1    Jun. 24, 2021

Related U.S. Application Data

(60) Provisional application No. 63/074,477, filed on Sep. 4, 2020.

(30) Foreign Application Priority Data

Dec. 23, 2020 (TW) ................................. 109145614

(51) Int. Cl.
*H04N 5/225* (2006.01)
*H04N 5/235* (2006.01)
(Continued)

(52) U.S. Cl.
CPC ........... *H04N 5/2355* (2013.01); *G06T 7/001* (2013.01); *G06T 7/40* (2013.01); *H04N 5/2258* (2013.01);
(Continued)

(58) Field of Classification Search
CPC .. H04N 5/2355; H04N 5/2258; H04N 5/2356; H04N 5/332; G06T 7/001;
(Continued)

(56) References Cited

U.S. PATENT DOCUMENTS

2008/0024608 A1    1/2008 Hahn et al.
2011/0228096 A1    9/2011 Friel et al.
(Continued)

FOREIGN PATENT DOCUMENTS

CN        102461156        5/2012
CN        107431760       12/2017
(Continued)

OTHER PUBLICATIONS

"Office Action of Taiwan Counterpart Application, Application No. 109145614", dated Mar. 3, 2022, p. 1-p. 17.
(Continued)

*Primary Examiner* — Kelly L Jerabek
(74) *Attorney, Agent, or Firm* — JCIPRNET (57) ABSTRACT

A dual sensor imaging system and an imaging method thereof are provided. The dual sensor imaging system includes at least one color sensor, at least one infrared ray (IR) sensor, a storage device, and a processor. The processor is configured to load and execute a computer program stored in the storage device to: identify an imaging scene of the dual sensor imaging system; control the color sensor and the IR sensor to respectively capture multiple color images and multiple IR images by adopting multiple exposure conditions suitable for the imaging scene; adaptively select a combination of the color image and the IR image that can reveal details of the imaging scene; and fuse the selected color image and IR image to generate a scene image with details of the imaging scene.

18 Claims, 9 Drawing Sheets

(51) Int. Cl.
*G06T 7/00* (2017.01)
*G06T 7/40* (2017.01)

(52) U.S. Cl.
CPC . *H04N 5/2356* (2013.01); *G06T 2207/10024* (2013.01); *G06T 2207/20208* (2013.01); *G06T 2207/20221* (2013.01)

(58) Field of Classification Search
CPC .... G06T 7/40; G06T 7/30; G06T 5/50; G06T 2207/10024; G06T 2207/10048; G06T 2207/20208; G06T 2207/20221
See application file for complete search history.

(56) References Cited

U.S. PATENT DOCUMENTS

| | | |
|---|---|---|
| 2011/0298898 A1 | 12/2011 | Jung et al. |
| 2012/0189293 A1 | 7/2012 | Cao et al. |
| 2013/0342703 A1 | 12/2013 | Lin |
| 2015/0245062 A1 | 8/2015 | Shimizu et al. |
| 2015/0334283 A1 | 11/2015 | Vranceanu |
| 2017/0078590 A1 | 3/2017 | Hogasten et al. |
| 2017/0094141 A1 | 3/2017 | Hicks |
| 2017/0318222 A1 | 11/2017 | Mantzel et al. |
| 2017/0330053 A1 | 11/2017 | Park et al. |
| 2018/0139431 A1 | 5/2018 | Simek et al. |
| 2018/0278832 A1 | 9/2018 | Shabtay et al. |
| 2018/0376044 A1* | 12/2018 | Lajevardi .............. G01J 3/2823 |
| 2019/0197667 A1 | 6/2019 | Paluri |
| 2019/0253647 A1* | 8/2019 | Park ....................... H04N 5/345 |
| 2020/0045247 A1* | 2/2020 | Okamoto ................. G06T 5/50 |
| 2020/0126246 A1 | 4/2020 | Mantzel et al. |
| 2020/0134849 A1 | 4/2020 | Blasco Claret et al. |
| 2020/0166646 A1 | 5/2020 | Van Der Sijde et al. |
| 2020/0193584 A1 | 6/2020 | Park et al. |
| 2020/0204717 A1* | 6/2020 | Yamamoto .............. G06T 5/009 |
| 2020/0294214 A1 | 9/2020 | Numata |
| 2021/0201476 A1 | 7/2021 | Prasad et al. |

FOREIGN PATENT DOCUMENTS

| | | |
|---|---|---|
| CN | 107846537 | 3/2018 |
| CN | 108419061 | 8/2018 |
| CN | 110462686 | 11/2019 |
| CN | 110706178 | 1/2020 |
| CN | 111527743 | 8/2020 |
| CN | 111540003 | 8/2020 |
| TW | M458748 | 8/2013 |
| TW | 201721269 | 6/2017 |
| TW | 201931847 | 8/2019 |
| WO | 2020055619 | 3/2020 |

OTHER PUBLICATIONS

"Office Action of U.S. Appl. No. 17/214,946", dated Apr. 13, 2022, p. 1-p. 36.

"Office Action of U.S. Appl. No. 17/191,701", dated Apr. 28, 2022, p. 1-p. 21.

"Office Action of Taiwan Related Application, application No. 109146922", dated Oct. 28, 2021, p. 1-p.14.

"Office Action of Taiwan Related Application, application No. 109145632", dated Nov. 10, 2021, p. 1-p. 8.

"Office Action of Taiwan Related Application, application No. 109146831", dated Nov. 30, 2021, p. 1-p. 21.

"Office Action of Taiwan Related Application, application No. 109146764", dated Dec. 28, 2021, p. 1-p. 8.

* cited by examiner

DUAL SENSOR IMAGING SYSTEM AND IMAGING METHOD THEREOF

CROSS-REFERENCE TO RELATED APPLICATION

This application claims the priority benefit of U.S. Provisional Application No. 63/074,477, filed on Sep. 4, 2020 and Taiwan application serial no. 109145614, filed on Dec. 23, 2020. The entirety of each of the above-mentioned patent applications is hereby incorporated by reference herein and made a part of this specification.

BACKGROUND

Technical Field

The disclosure relates to an imaging system and an imaging method, and in particular to a dual sensor imaging system and an imaging method thereof.

Description of Related Art

The exposure conditions of a camera (including aperture, shutter, and photosensitivity) may affect the quality of a captured image. Therefore, many cameras automatically adjust the exposure conditions during the image capturing process to obtain clear and bright images. However, in high-contrast scenes such as low light sources or backlights, the result of adjusting the exposure conditions of the camera may result in excessive noise or overexposure in some areas, such that the image quality of all areas cannot be taken care of.

Figure 1:
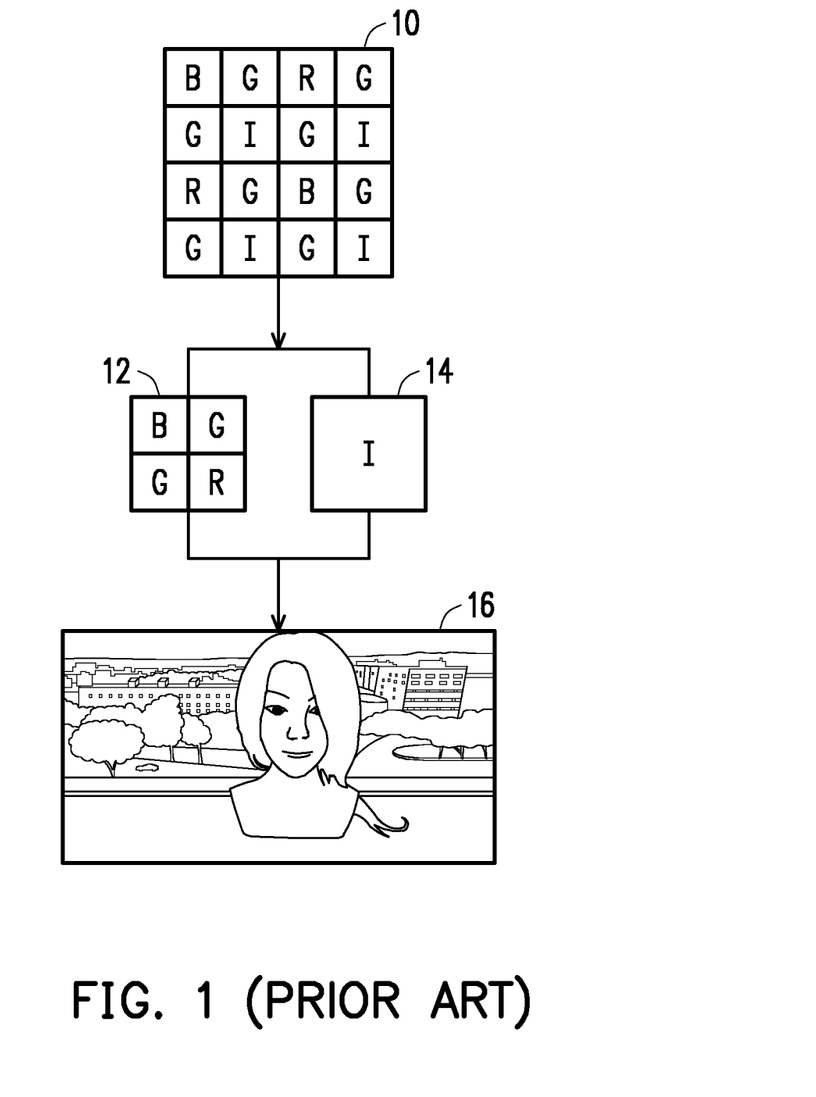
FIG. 1 is a schematic diagram of conventional image capture using an image sensor.

In this regard, the current technology adopts a new image sensor architecture, which utilizes the characteristic of high light sensitivity of the infrared ray (IR) sensor, and interleaves IR pixels among the color pixels of the image sensor to assist in brightness detection. For example, FIG. 1 is a schematic diagram of conventional image capture using an image sensor. Please refer to FIG. 1, in addition to red (R), green (G), blue (B), and other color pixels, a conventional image sensor 10 is also interleaved with infrared (I) pixels. In this way, the image sensor 10 can combine color information 12 captured by the R, G, and B color pixels with brightness information 14 captured by the I pixels to obtain an image 16 with moderate color and brightness.

However, under the architecture of the single image sensor, the exposure conditions of each pixel in the image sensor are the same. Therefore, only the exposure conditions more suitable for color pixels or I pixels can be selected to capture images. It is still impossible to effectively use the characteristics of the two types of pixels to improve the image quality of the captured image.

SUMMARY

The disclosure provides a dual sensor imaging system and an imaging method thereof, which use independently configured color sensor and infrared ray (IR) sensor to capture multiple images under different exposure conditions, select the color and IR images with the appropriate exposure conditions to be fused as a result image, so as to complement the texture details of the color images and improve the image quality of the captured image.

The dual sensor imaging system of the disclosure includes at least one color sensor, at least one IR sensor, a storage device, and a processor coupled to the color sensor, the IR sensor, and the storage device. The processor is configured to load and execute a computer program stored in the storage device to: identify an imaging scene of the dual sensor imaging system; control the color sensor and the IR sensor to respectively capture multiple color images and multiple IR images by adopting multiple exposure conditions suitable for the imaging scene; adaptively select a combination of the color image and the IR image that can reveal details of the imaging scene; and fuse the selected color image and IR image to generate a scene image with details of the imaging scene.

The imaging method of dual sensor imaging system, which is adapted to the dual sensor imaging system including at least one color sensor, at least one IR sensor, a storage device and a processor. The method includes the following steps. An imaging scene of the dual sensor imaging system is identified. The color sensor and the IR sensor are controlled to respectively capture multiple color images and multiple IR images by adopting multiple exposure conditions suitable for the imaging scene. A combination of the color image and the IR image that can reveal details of the imaging scene is adaptively selected. The selected color image and IR image are fused to generate a scene image with details of the imaging scene.

Based on the above, the dual sensor imaging system and the imaging method thereof of the disclosure use independently configured color sensor and IR sensor to capture multiple images suitable for different exposure conditions of the current imaging scene, and select a combination of the color image and the IR image that can reveal the details of the imaging scene for fusion, so as to generate the scene image with the details of the imaging scene and improve the image quality of the captured image.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 2:
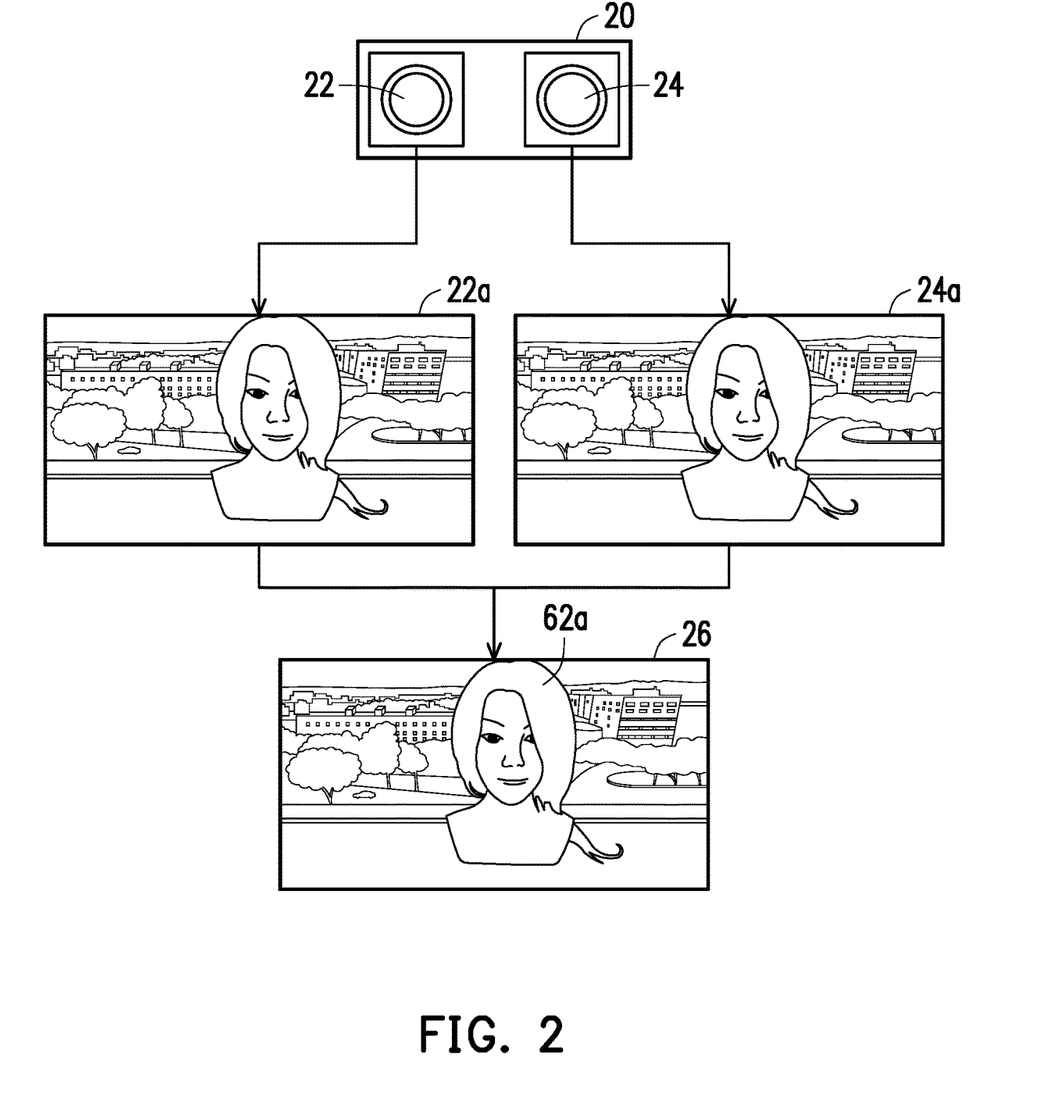
FIG. 2 is a schematic diagram of image capture using an image sensor according to an embodiment of the disclosure.

FIG. 2 is a schematic diagram of image capture using an image sensor according to an embodiment of the disclosure. Please refer to FIG. 2, an image sensor 20 of an embodiment of the disclosure adopts a dual sensor architecture of independently configured color sensor 22 and infrared ray (IR) sensor 24. Using the characteristics of each of the color sensor 22 and the IR sensor 24, multiple images are respectively captured by adopting multiple exposure conditions suitable for the current imaging scene, and a color image 22a and an IR image 24a with appropriate exposure conditions are selected. Through image fusion, the IR image 24a is configured to complement the texture details lacking in the color image 22a, so as to obtain a scene image 26 with good color and texture details.

Figure 3:
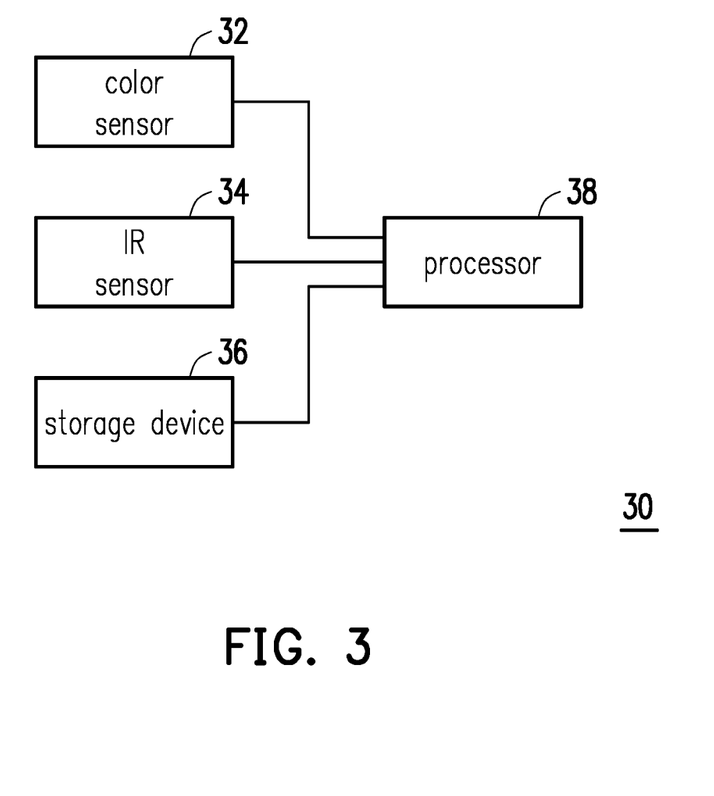
FIG. 3 is a block diagram of a dual sensor imaging system according to an embodiment of the disclosure.

FIG. 3 is a block diagram of a dual sensor imaging system according to an embodiment of the disclosure. Please refer to FIG. 3, a dual sensor imaging system 30 of the present embodiment is configured in electronic devices such as mobile phones, tablets, laptops, navigation devices, dashcams, digital cameras, digital video cameras, etc., and is configured to provide an imaging function. The dual sensor imaging system 30 includes at least one color sensor 32, at least one IR sensor 34, a storage device 36, and a processor 38, and the functions thereof are as follows.

The color sensor 32, for example, includes a charge coupled device (CCD), a complementary metal-oxide semiconductor (CMOS) element, or other types of photosensitive elements, and may sense light intensity to generate images of the imaging scene. The color sensor 32 is, for example, an RGB image sensor which includes red (R), green (G), and blue (B) color pixels, and is configured to capture color information of red light, green light, blue light, etc. in the imaging scene, and fuse the color information to generate a color image of the imaging scene.

The IR sensor 34, for example, includes a CCD, a CMOS element, or other types of photosensitive elements, and can sense infrared ray by adjusting the wavelength sensing range of the photosensitive element. The IR sensor 34, for example, uses the above photosensitive elements as pixels to capture infrared information in the imaging scene, and fuse the infrared information to generate an IR image of the imaging scene.

The storage device 36 is, for example, any type of fixed or removable random access memory (RAM), read-only memory (ROM), flash memory, hard disk, similar elements, or a combination of the above elements, and is configured to store a computer program executed by the processor 38. In some embodiments, the storage device 36 may, for example, also store the color image captured by the color sensor 32 and the IR image captured by the IR sensor 34.

The processor 38 is, for example, a central processing unit (CPU), other programmable general-purpose or specific-purpose microprocessors, microcontrollers, digital signal processors (DSPs), programmable controllers, application specific integrated circuits (ASICs), programmable logic devices (PLDs), other similar devices, or a combination of these devices, and the disclosure is not limited thereto. In the present embodiment, the processor 38 may load a computer program from the storage device 36 to execute the imaging method of the dual sensor imaging system of the embodiment of the disclosure.

Figure 4:
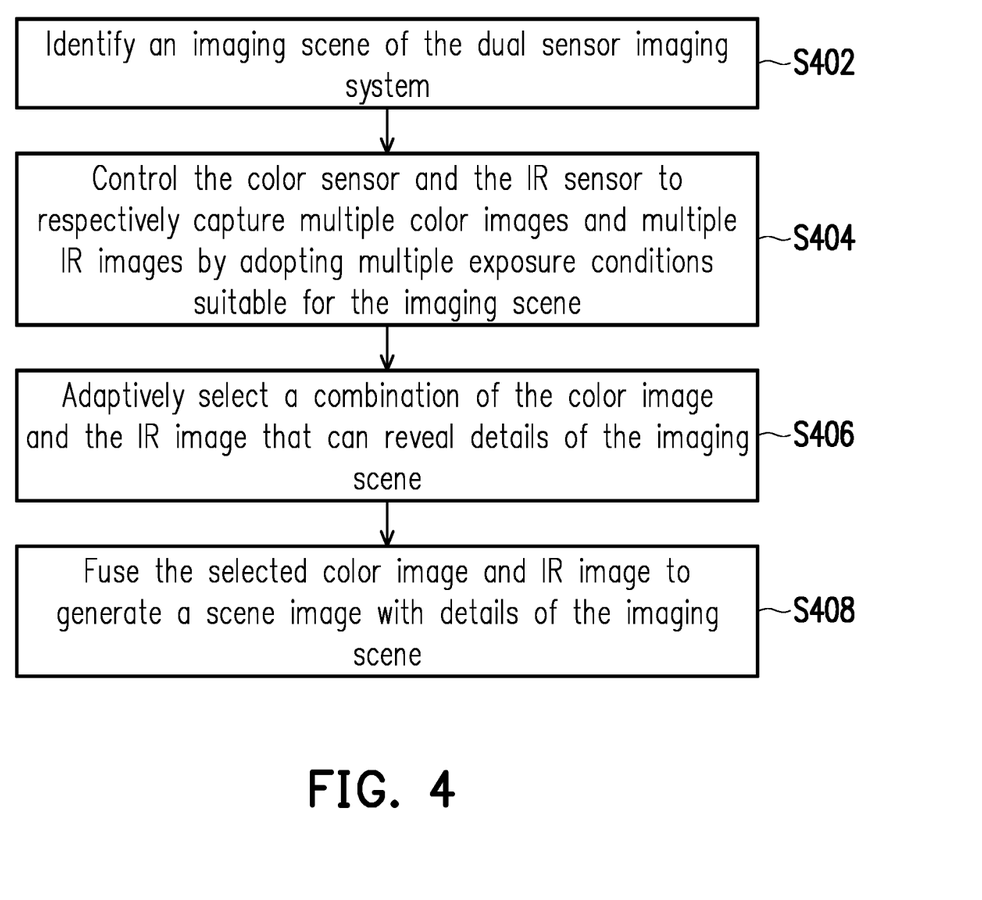
FIG. 4 is a flow chart of an imaging method of the dual sensor imaging system according to an embodiment of the disclosure.

FIG. 4 is a flow chart of an imaging method of the dual sensor imaging system according to an embodiment of the disclosure. Please refer to FIG. 3 and FIG. 4 at the same time, the method of this embodiment is applicable to the above-mentioned dual sensor imaging system 30, and the detailed steps of the imaging method of this embodiment are described below with the elements of the dual sensor imaging system 30.

In Step S402, the processor 38 identifies an imaging scene of the dual sensor imaging system 30. In some embodiments, the processor 38, for example, controls at least one of the color sensor 32 and the IR sensor 34 to capture at least one standard image of the imaging scene by adopting a standard exposure condition, and use these standard images to identify the imaging scene. The standard exposure condition, for example, includes aperture, shutter, photosensitivity, and other parameters determined by adopting existing metering technology. The processor 38 identifies the imaging scene, including the position (indoor or outdoor) of the imaging scene, the light source (high light source or low light source), contrast (high contrast or low contrast), type of target (object or portrait), state (dynamic or static), etc., according to strength or distribution of image parameters such as hue, value, chroma, and white balance of an image captured under the exposure condition. The imaging scene. In other embodiments, the processor 38 may also identify the imaging scene by adopting the positioning method or directly receiving the user operation to set the imaging scene, and is not limited thereto.

In Step S404, the processor 38 controls the color sensor 32 and the IR sensor 34 to respectively capture multiple color images and multiple IR images by adopting multiple exposure conditions suitable for the identified imaging scene. In some embodiments, the processor 38, for example, controls the color sensor 32 and the IR sensor 34 to capture color images with shorter or longer exposure time based on the exposure time in the standard exposure condition. The difference between the exposure time of these color images is, for example, any value between −3 and 3 exposure values (EV), which is not limited thereto. For example, If an A image is twice as bright as a B image, the EV of the B image may be increased by 1, and so on. The exposure value may have decimals (for example, +0.3 EV), and is not limited thereto. In some embodiments, instead of capturing multiple color images and multiple IR images as described above, the processor 38 may control the color sensor 32 to capturing only one color image while controlling the IR sensor 34 to capture multiple IR images for subsequent selection and fusion with the color image, or the processor 38 may control the IR sensor 34 to capturing only one IR image while controlling the color sensor 32 to capture multiple color images for subsequent selection and fusion with the IR image, which is not limited to the present embodiment.

In some embodiments, in case the dual sensor imaging system 30 is used to capture a video with a frame rate such as 30 fps (frame per second) or 60 fps in, for example, a live-view mode or a video mode, the processor 38 may respectively control the color sensor 32 and the IR sensor 34 to first capture one image of the imaging scene by adopting a standard or predetermined exposure condition, then analyzes histograms, distribution of bright/dark pixels, and/or backlight conditions of the captured images, and accordingly determines exposure conditions adapted for the imaging scene (i.e. the original exposure conditions may be adjusted or maintained) such that the color sensor 32 and the IR sensor 34 may adopt the exposure conditions adapted for current imaging scene to capture subsequent images. In some embodiments, the histogram of the image is calculated by accumulating a number of pixels with each brightness value in the image while in other embodiments, the histogram of the image is calculated by blocks divided from the image, which is not limited herein. As a result, the processor 38 may appropriately adjust the exposure conditions of the color sensor 32 and the IR sensor 34 in advance so as to obtain images with desired quality.

In Step S406, the processor 38 adaptively selects a combination of the color image and the IR image that can reveal details of the imaging scene. In some embodiments, the processor 38, for example, controls the color sensor 32 to capture a color image with appropriate exposure time, such that part of the color details of the imaging scene may be preserved, and the subsequently fused image is ensured to reveal the color details of the imaging scene. The appropriate exposure time is, for example, an exposure time that is shorter than the exposure time that will cause overexposure of the captured image by a preset time length. The preset time length is, for example, any value from 0.01 to 1 second, and is not limited thereto.

In some embodiments, the processor 38 may, for example, select one of the color images as a reference image according to the color details of each color image. Then, at least one defective area lacking texture details in the reference image is identified. Then, one of the IR images is selected as an image to be fused with the reference image according to the texture details of the image corresponding to these defect areas in each IR image.

In detail, since the color sensor 32 can only adopt a single exposure condition to capture a color image at a time. When the imaging scene has low light source or high contrast, each color image may have an area with high noise, overexposure, or underexposure (that is, the defective area). At this time, the processor 38 may use the characteristic of high light sensitivity of the IR sensor 34 to select the IR image with the texture details of the defect area from the previously captured IR images for the above defect area, so as to complement the texture details of the defect area in the color image.

In Step S408, the processor 38 fuses the selected color image and IR image to generate a scene image with details of the imaging scene. In some embodiments, the processor 38 directly fuses the selected color image and entire image of the IR image by, for example, calculating the average or weighted average of the pixel values of corresponding pixels in the selected color image and entire image of the IR image, or adopting other image fusion measures. In some embodiments, the processor 38 may also only focus on the defect area in the color image, and use the image corresponding to the defect area in the IR image to fill in or replace the image of the defect area in the color image, and is not limited thereto.

By the above method, the dual sensor camera system 30 may not only select the color image with better color details, but also use the image of the corresponding area in the IR image to fill in or replace the area with insufficient texture details in the color image. Finally, an image that may include all the details (color and texture details) of the imaging scene is generated to improve the image quality of the captured image.

Figure 5:
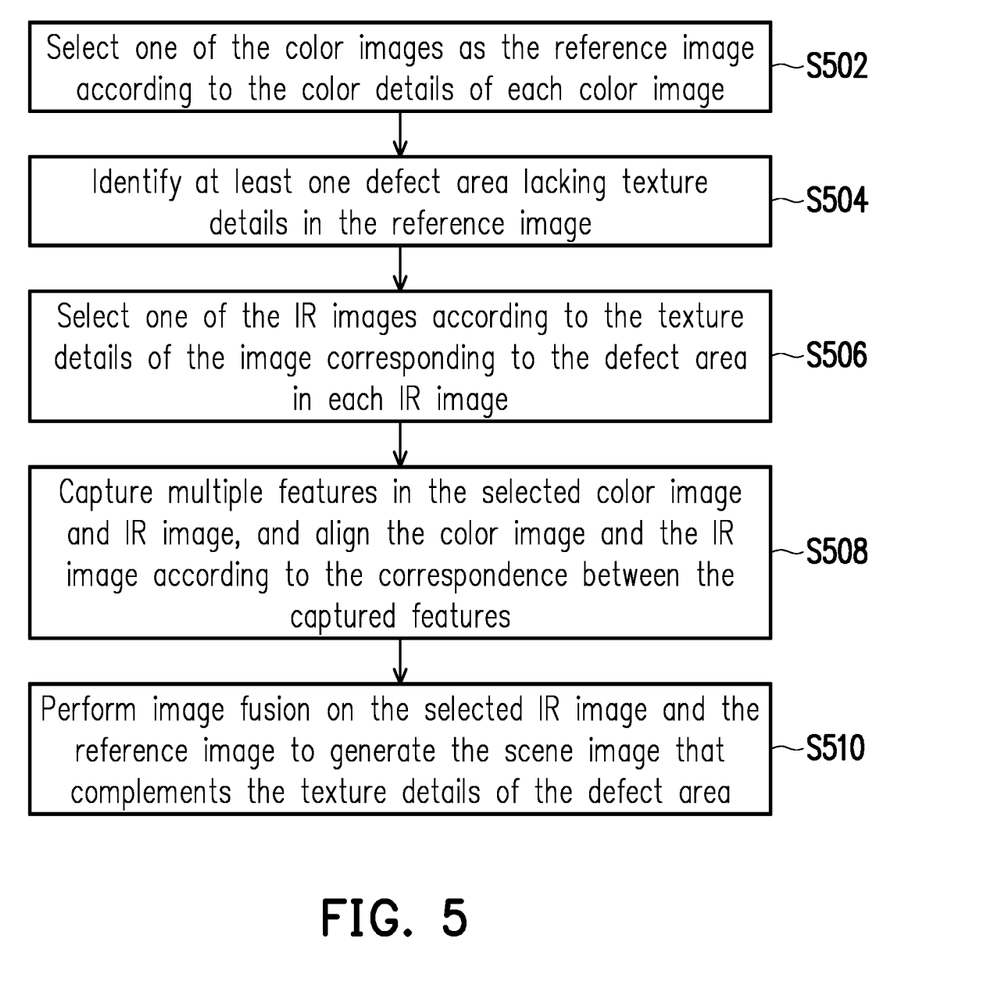
FIG. 5 is a flow chart of an imaging method of the dual sensor imaging system according to an embodiment of the disclosure.

FIG. 5 is a flow chart of an imaging method of the dual sensor imaging system according to an embodiment of the disclosure. Please refer to FIG. 3 and FIG. 5 at the same time, the present embodiment further illustrates the detailed implementation of the above embodiment for fusion of the entire image. The method of the present embodiment is suitable for the dual sensor imaging system 30, and the following is a description of the detailed steps of the imaging method of the present embodiment in conjunction with the elements of the dual sensor imaging system 30.

In Step S502, the processor 38 selects one of the color images as the reference image according to the color details of each color image. In the embodiment, the processor 38, for example, selects the color image with the most color details as the reference image. The amount of the color details may be determined, for example, by the size of the overexposed or underexposed area in the color image. In detail, the color of pixels in the overexposed area approaches white, and the color of pixels in the underexposed area approaches black, so the color details in these areas will be less. Therefore, if the color image includes more areas of this type, it means that the color details thereof are less. Based on this, the processor 38 may determine which color image has the most color details to be used as the reference image. In other embodiments, the processor 38 may also distinguish the amount of color details according to the contrast, saturation, or other image parameters of each color image, and is not limited thereto.

In Step S504, the processor 38 identifies at least one defect area lacking texture details in the reference image. The defect area is, for example, the above overexposed or underexposed area, or an area with higher noise captured under low light source, and is not limited thereto.

In Step S506, the processor 38 selects one of the IR images according to the texture details of the image corresponding to the defect area in each IR image. In the embodiment, the processor 38, for example, selects the IR image with the most texture details of the image corresponding to the defect area as the image to be fused with the reference image. The processor 38, for example, distinguishes the amount of texture details according to the contrast or other image parameters of each IR image, and is not limited thereto.

In Step S508, the processor 38 executes feature capture on the selected color image and IR image to capture multiple features in the color image and the IR image, and aligns the color image and the IR image according to the correspondence between the captured features. It should be noted that the above feature capturing and aligning measures are only examples. In other embodiments, the processor 38 may also use other types of image aligning measures to align the color image and the IR image, and is not limited thereto.

In Step S510, the processor 38 performing image fusion on the aligned IR image and reference image to generate the scene image that complements the texture details of the defect area.

In some embodiments, the processor 38, for example, calculates the average or weighted average of the pixel values of the corresponding pixels in the color image and the entire image of the IR image for image fusing the IR image with the reference image.

In some embodiments, the processor 38, for example, converts the color space of the reference image from the RGB color space to the YUV color space, and replaces the brightness component of the converted reference image with the brightness component of the IR image. Then, the color space of the replaced reference image is converted back to the RGB color space to generate the scene image. In other embodiments, the processor 38 may also convert the color space of the reference image to YCbCr, CMYK, or other types of color spaces, and then convert back to the original color space after replacing the brightness component, and the present embodiment does not limit the conversion measure of the color space.

In detail, since the brightness component of the IR image has a better signal-to-noise ratio (SNR) and includes more texture details of the imaging scene, the brightness component of the IR image directly replaces the brightness component of the reference image, which may greatly increase the texture details in the reference image.

By the above method, the dual sensor imaging system 30 may use the IR image to increase the texture details of the color image, especially for areas with insufficient texture details, thereby improving the image quality of the captured image.

Figure 6:
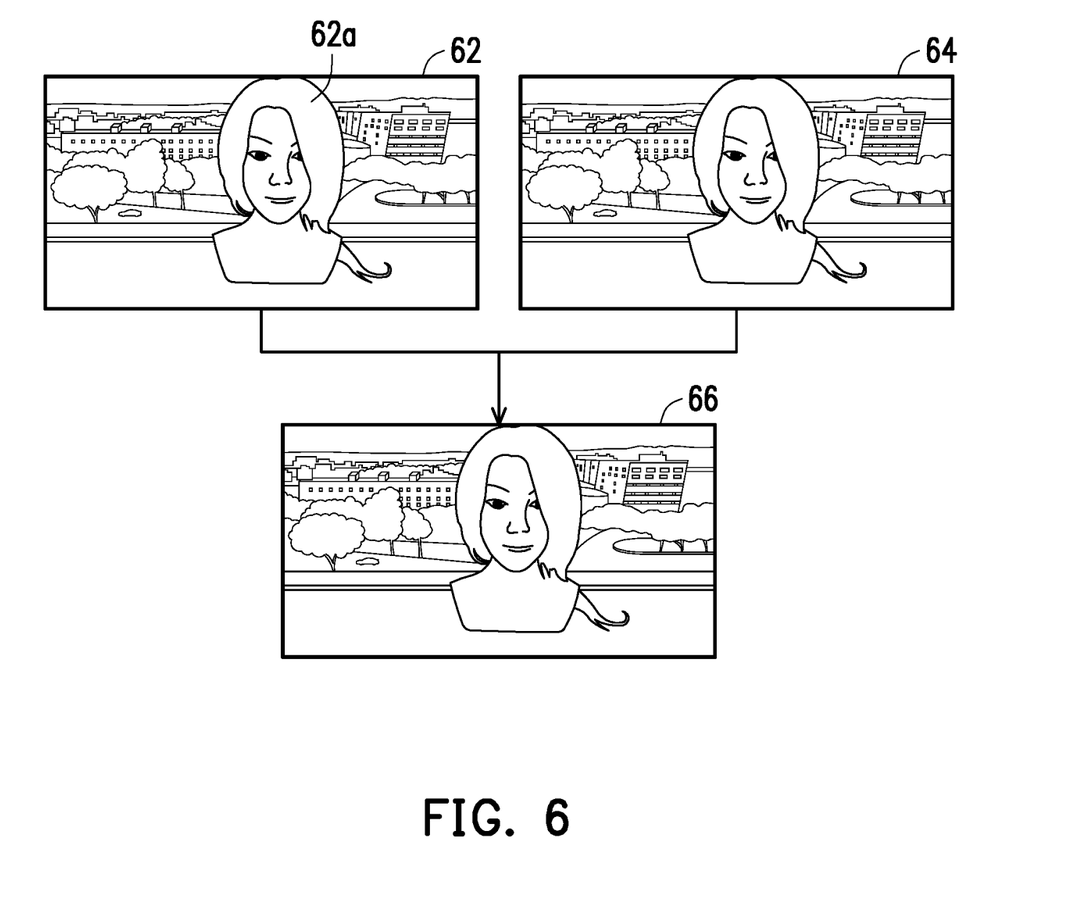
FIG. 6 is an example of an imaging method of the dual sensor imaging system according to an embodiment of the disclosure.

For example, FIG. 6 is an example of an imaging method of the dual sensor imaging system according to an embodiment of the disclosure. Please refer to FIG. 6, a color image 62 with the most color details is selected as the reference image through the above imaging method of FIG. 5 in the embodiment. For the defect area (such as a face area 62*a*) lacking texture details in the color image 62, an IR image 64 with the most detailed texture of the defect area is selected from the multiple IR images captured by adopting different exposure conditions for image fusion with the color image 62, so as to obtain a scene image 66 with more color details and texture details at the same time.

Figure 7:
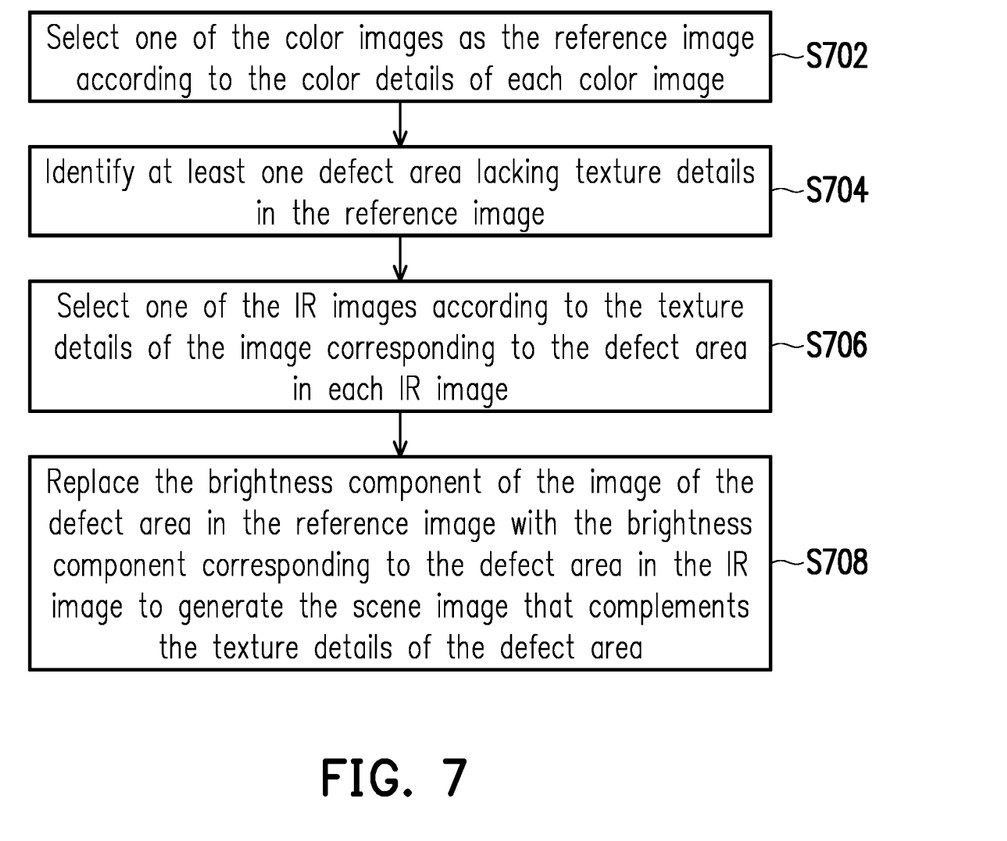
FIG. 7 is a flow chart of an imaging method of the dual sensor imaging system according to an embodiment of the disclosure.

FIG. 7 is a flow chart of an imaging method of the dual sensor imaging system according to an embodiment of the disclosure. Please refer to FIG. 3 and FIG. 7 at the same time, the embodiment further illustrates the detailed implementation of the above embodiment for fusion of the defect area. The method of the present embodiment is suitable for the dual sensor imaging system 30, and the following is a description of the detailed steps of the imaging method of the present embodiment in conjunction with the elements of the dual sensor imaging system 30.

In Step S702, the processor 38 selects one of the color images as the reference image according to the color details of each color image. In Step S704, the processor 38 identifies at least one defect area lacking texture details in the reference image. In Step S706, the processor 38 selects one of the IR images according to the texture details of the image corresponding to the defect area in each IR image. The implementation of the above Steps S702 to S706 is respectively the same or similar to Steps S502 to S506 of the foregoing embodiment, so the details will not be repeated here.

Different from the foregoing embodiment, in Step S708, the processor 38 replaces the brightness component of the image of the defect area in the reference image with the brightness component corresponding to the defect area in the IR image to generate the scene image that complements the texture details of the defect area.

In some embodiments, the processor 38, for example, converts the color space of the reference image from the RGB color space to the YUV color space, and replaces the brightness component of the image of the defect area of the converted reference image with the brightness component corresponding to the defect area in the IR image. Then, the color space of the replaced reference image is converted back to the RGB color space to generate the scene image. In other embodiments, the processor 38 may also convert the color space of the reference image to YCbCr, CMYK, or other types of color spaces, and then convert back to the original color space after replacing the brightness component, and the embodiment does not limit the conversion measure of the color space.

By the above method, the dual sensor imaging system 30 may use the IR images to fill in the area with insufficient texture details in the color image, thereby improving the image quality of the captured image.

Figure 8:
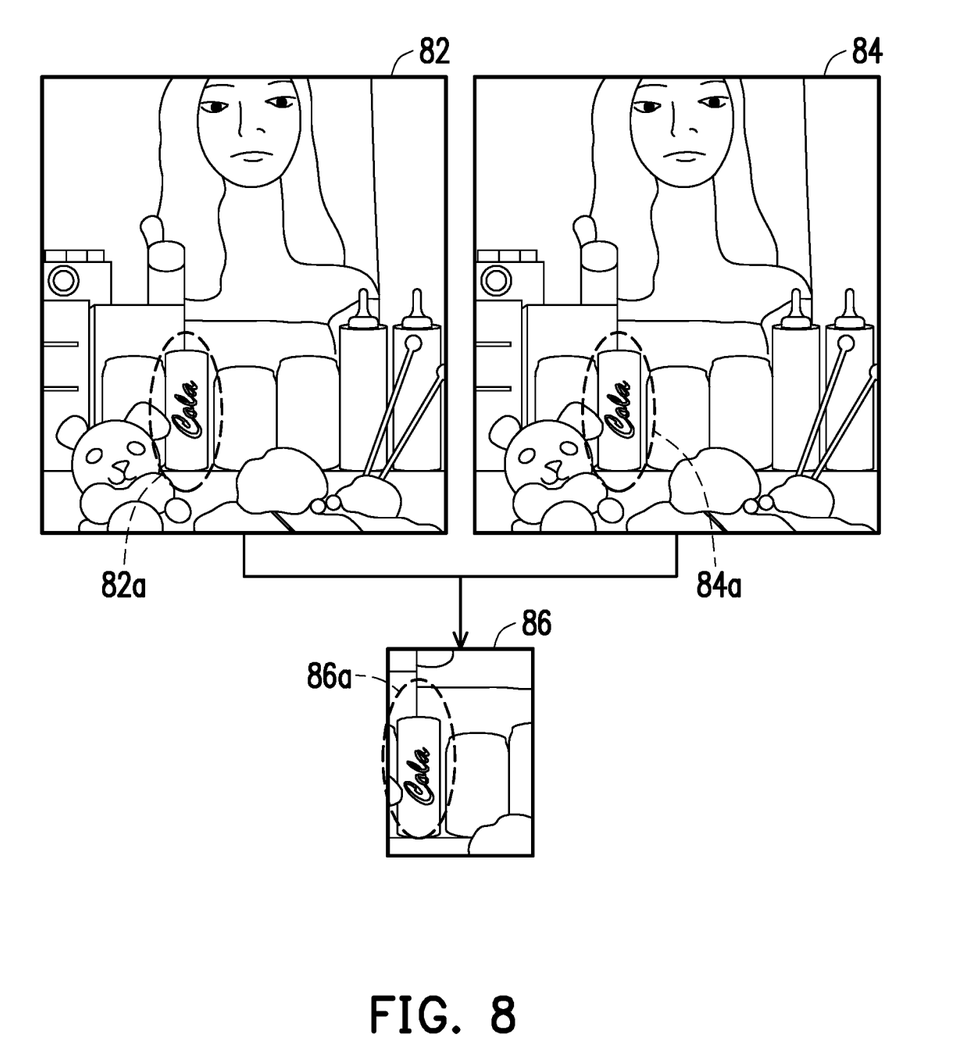
FIG. 8 is an example of an imaging method of the dual sensor imaging system according to an embodiment of the disclosure.

For example, FIG. 8 is an example of an imaging method of the dual sensor imaging system according to an embodiment of the disclosure. Please refer to FIG. 8, a color image 82 with the most color details is selected as the reference image through the above imaging method of FIG. 7 in the embodiment. For the defect area (such as a Coke can area 82*a*) lacking texture details in the color image 82, an IR image 84 with the most detailed texture of the defect area is selected from the multiple IR images captured by adopting different exposure conditions, and the brightness component of the Coke can area 82*a* is replaced with the brightness component of a corresponding coke can area 84*a* in the IR image 84, so as to obtain a scene image 86 with a Coke can area 86*a* having more texture details.

It should be noted that, in some embodiments, the texture details of some defect areas in the color image may not be enhanced or complemented by the IR image due to specific factors. For example, the parallax between the color sensor 32 and the IR sensor 34 will cause the IR sensor 34 to be obscured. In this case, the embodiment of the disclosure provides an alternative way to increase the texture details of the defect area to maximize the image quality of the captured image.

Figure 9:
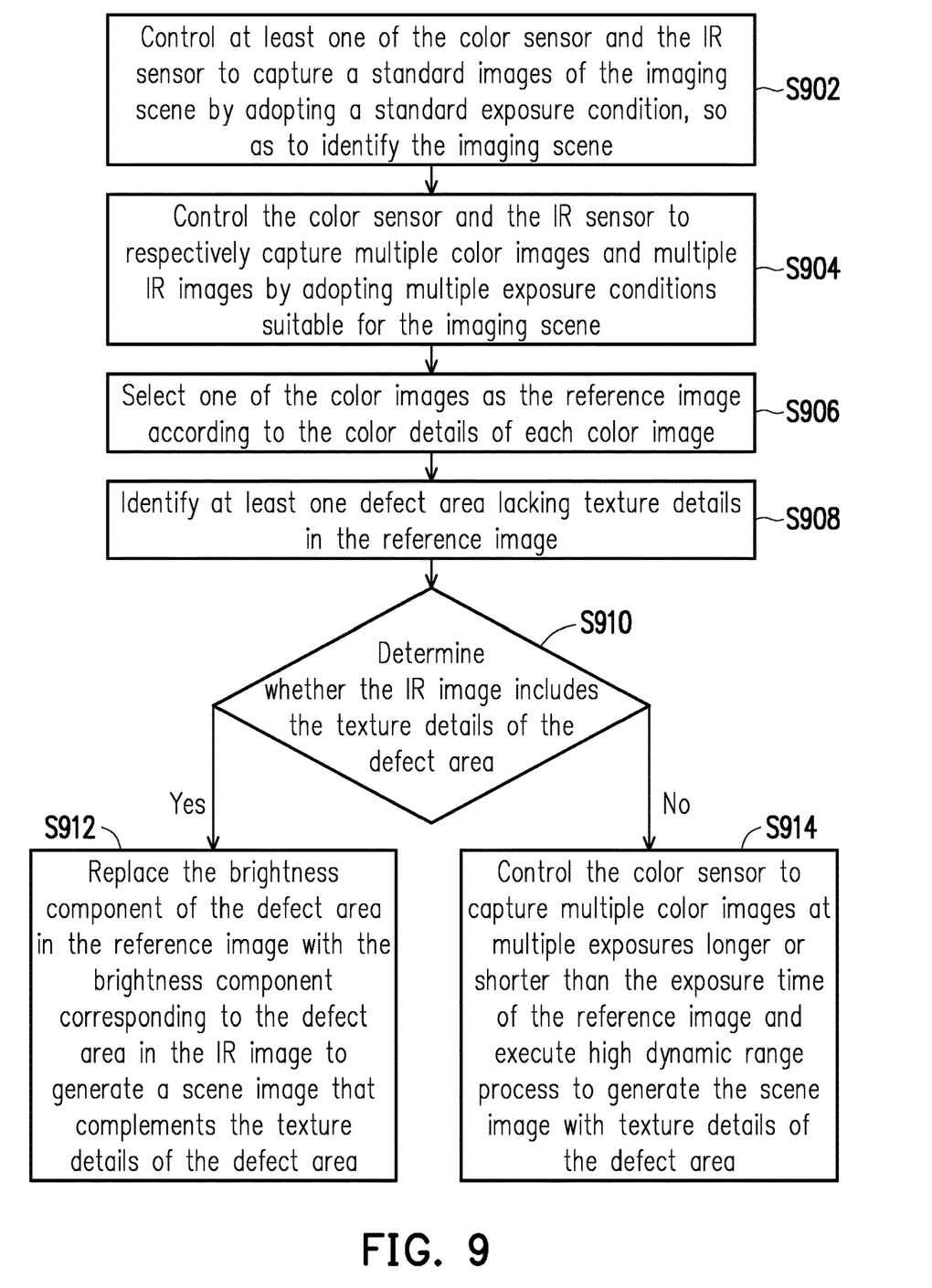
FIG. 9 is a flow chart of an imaging method of the dual sensor imaging system according to an embodiment of the disclosure.

FIG. 9 is a flow chart of an imaging method of the dual sensor imaging system according to an embodiment of the disclosure. Please refer to FIG. 3 and FIG. 9 at the same time, the method of the present embodiment is suitable for the dual sensor imaging system 30, and the following is a description of the detailed steps of the imaging method of the present embodiment in conjunction with the elements of the dual sensor imaging system 30.

In Step S902, the processor 38 controls at least one of the color sensor 32 and the IR sensor 34 to capture at least one standard image of the imaging scene by adopting the standard exposure condition, and to identify the imaging scene using the standard images. The definition of the standard exposure condition and the identifying measure of the imaging scene are as described in the foregoing embodiment, and will not be repeated here.

In Step S904, the processor 38 controls the color sensor 32 and the IR sensor 34 to respectively capture multiple color images and multiple IR images by adopting multiple exposure conditions suitable for the identified imaging scene. In Step S906, the processor 38 selects one of the color images as the reference image according to the color details of each color image. In Step S908, the processor 38 identifies at least one defect area lacking texture details in the reference image. The implementation of the above Steps S904 to S908 is respectively the same or similar to Steps S404, and S702 to S704 of the foregoing embodiment, so the details will not be repeated here.

Different from the foregoing embodiment, in Step S910, the processor 38 may determine whether any of the IR images includes the texture details of the defect area in the reference image. The processor 38, for example, checks whether there is an image in the area corresponding to the defect area in each IR image, so as to determine whether the IR sensor 34 is obscured, and determine whether the IR image may be configured to fill in the texture details of the defect area in the reference image.

If there is the IR image that includes the texture details of the defect area, in Step S912, the processor 38 replaces the brightness component of the image of the defect area in the reference image with the brightness component corresponding to the defect area in the IR image to generate a scene image with the texture details of the defect area being complemented. The implementation of the above Step S912 is the same or similar to Step S708 of the foregoing embodiment, so the details will not be repeated here.

If there is no IR image that includes the texture details of the defect area, in Step S914, the processor 38 controls the color sensor 32 to capture multiple color images at multiple exposures longer or shorter than the exposure time of the reference image and execute high dynamic range (HDR) process to generate the scene image with texture details of the defect area.

In some embodiments, the processor 38, for example, uses an exposure time shorter than the exposure time of the selected reference image and an exposure time longer than the exposure time of the selected reference image according to the exposure time of the selected reference image, and controls the color sensor 32 to respectively capture a color image with the shorter exposure time and a color image with the longer exposure time. Then, the color images captured using the original exposure time are combined to implement an HDR process. That is, an area with better color and texture details is selected from three color images to complement areas lacking details in other color images, so as to obtain an HDR image with good details in bright and dark parts as the final output scene image.

In some embodiments, the processor 38, for example, executes noise reduction (NR) process, such as 2D spatial denoise, for the HDR image to reduce the noise in the HDR image and improve the image quality of the final output image.

In some embodiments, the processor 38 may combine the process measures of the above Steps S912 and S914 to individually select appropriate process measures for multiple defect areas in the reference image, so as to maximize the details of the reference image, thereby improving the image quality of the captured image.

In summary, the dual sensor imaging system and the imaging method thereof of the disclosure use independently configured color sensor and (IR) sensor to respectively capture multiple images suitable for multiple exposure conditions of the current imaging scene, so as to select a combination of the color image and the IR image with appropriate exposure conditions for fusion, and use the IR image to fill in or increase the lack of texture details in the color image. Therefore, the scene image with the details of the imaging scene may be generated to improve the image quality of the captured image.

What is claimed is:

1. A dual sensor imaging system, comprising:
   at least one color sensor;
   at least one infrared ray (IR) sensor;
   a storage device, storing a computer program; and
   a processer, coupled to the at least one color sensor, the at least one IR sensor, and the storage device, and configured to load and execute the computer program to:
   identify an imaging scene of the dual sensor imaging system;
   control the at least one color sensor and the at least one IR sensor to respectively capture a plurality of color images and a plurality of IR images by adopting a plurality of exposure conditions suitable for the imaging scene;
   adaptively select a combination of the color image and the IR image that can reveal details of the imaging scene; and
   fuse the selected color image and IR image to generate a scene image with the details of the imaging scene, wherein the processor:
   selects one of the color images as a reference image according to color details of each of the color images;
   identifies at least one defect area lacking texture details in the reference image; and
   selects one of the IR images according to texture details of an image corresponding to the at least one defect area in each of the IR images to be fused with the reference image.

2. The dual sensor imaging system according to claim 1, wherein the processor:
   controls at least one of the at least one color sensor and the at least one IR sensor to capture at least one standard image of the imaging scene by adopting a standard exposure condition, and uses the at least one standard image to identify the imaging scene.

3. The dual sensor imaging system according to claim 1, wherein the processor:
   selects the color image with the most color details as the reference image; and
   selects the IR image with the most texture details of the image corresponding to the at least one defect area to be fused with the reference image.

4. The dual sensor imaging system according to claim 1, wherein the processor:
   replaces a brightness component of an image of the at least one defect area in the reference image with the image corresponding to the at least one defect area in the IR image to generate the scene image that complements the texture details of the at least one defect area.

5. The dual sensor imaging system according to claim 1, wherein the processor:
   performs image fusion on the selected IR image and reference image to generate the scene image that complements the texture details of the at least one defect area.

6. The dual sensor imaging system according to claim 1, wherein the processor:
   determines whether each of the IR images comprises the texture details of the at least one defect area; and
   controls the at least one color sensor to capture a plurality of color images at a plurality of exposures longer or shorter than an exposure time of the reference image and executes high dynamic range process when all of the IR images do not comprise the texture details to generate the scene image with the texture details of the at least one defect area.

7. The dual sensor imaging system according to claim 1, wherein the processor:
   converts a color space of the selected color image from an RGB color space to a YUV color space;
   replaces a brightness component of an image of the at least one defect area of the converted color image with an image corresponding to the at least one defect area of the selected IR image; and
   converts a color space of the replaced color image back to the RGB color space to generate the scene image.

8. The dual sensor imaging system according to claim 1, wherein the processor:
   converts a color space of the selected color image from an RGB color space to a YUV color space;
   replaces a brightness component of the converted color image with a brightness component of the selected IR image; and
   converts a color space of the replaced color image back to the RGB color space to generate the scene image.

9. The dual sensor imaging system according to claim 1, wherein the processor:

captures a plurality of features in the selected color image and IR image, and aligns the color image and the IR image according to correspondence between the captured features.

10. An imaging method of a dual sensor imaging system, wherein the dual sensor imaging system comprises at least one color sensor, at least one IR sensor, and a processor, the method comprising:
identifying an imaging scene of the dual sensor imaging system;
controlling the at least one color sensor and the at least one IR sensor to respectively capture a plurality of color images and a plurality of IR images by adopting a plurality of exposure conditions suitable for the imaging scene;
adaptively selecting a combination of the color image and the IR image that can reveal details of the imaging scene, comprising:
selecting one of the color images as a reference image according to color details of each of the color images;
identifying at least one defect area lacking texture details in the reference image; and
selecting one of the IR images according to texture details of an image corresponding to the at least one defect area in each of the IR images; and
fusing the selected color image and IR image to generate a scene image with the details of the imaging scene.

11. The imaging method according to claim 10, wherein the step of identifying the imaging scene of the dual sensor imaging system comprises:
controlling one of the at least one color sensor and the at least one IR sensor to capture at least one standard image of the imaging scene by adopting a standard exposure condition, and using the at least one standard image to identify the imaging scene.

12. The imaging method according to claim 10, wherein the step of adaptively selecting the combination of the color image and the IR image that can reveal the details of the imaging scene comprises:
selecting the color image with the most color details as the reference image; and
selecting the IR image with the most texture details of the image corresponding to the at least one defect area to be fused with the reference image.

13. The imaging method according to claim 10, wherein the step of fusing the selected color image and IR image to generate the scene image with the details of the imaging scene comprises:
replacing a brightness component of an image of the at least one defect area in the reference image with the image corresponding to the at least one defect area in the IR image to generate the scene image that complements the texture details of the at least one defect area.

14. The imaging method according to claim 10, wherein the step of fusing the selected color image and IR image to generate the scene image with the details of the imaging scene comprises:
performing image fusion on the selected IR image and reference image to generate the scene image that complements the texture details of the at least one defect area.

15. The imaging method according to claim 10, wherein before the step of fusing the selected color image and IR image to generate the scene image with the details of the imaging scene, the method further comprises:
determining whether each of the IR images comprises the texture details of the at least one defect area; and
controlling the at least one color sensor to capture a plurality of color images at a plurality of exposures longer or shorter than an exposure time of the reference image and executing high dynamic range process when all of the IR images do not comprise the texture details to generate the scene image with the texture details of the at least one defect area.

16. The imaging method according to claim 10, wherein the step of fusing the selected color image and IR image to generate the scene image with the details of the imaging scene comprises:
converting a color space of the selected color image from an RGB color space to a YUV color space;
replacing a brightness component of an image of the at least one defect area of the converted color image with an image corresponding to the at least one defect area of the selected IR image; and
converting a color space of the replaced color image back to the RGB color space to generate the scene image.

17. The imaging method according to claim 10, wherein the step of fusing the selected color image and IR image to generate the scene image with the details of the imaging scene comprises:
converting a color space of the selected color image from an RGB color space to a YUV color space;
replacing a brightness component of the converted color image with a brightness component of the selected IR image; and
converting a color space of the replaced color image back to the RGB color space to generate the scene image.

18. The imaging method according to claim 10, wherein before the step of fusing the selected color image and IR image to generate the scene image with the details of the imaging scene, the method further comprises:
capturing a plurality of features in the selected color image and IR image, and aligning the color image and the IR image according to correspondence between the captured features.

* * * * *